Figure 1:
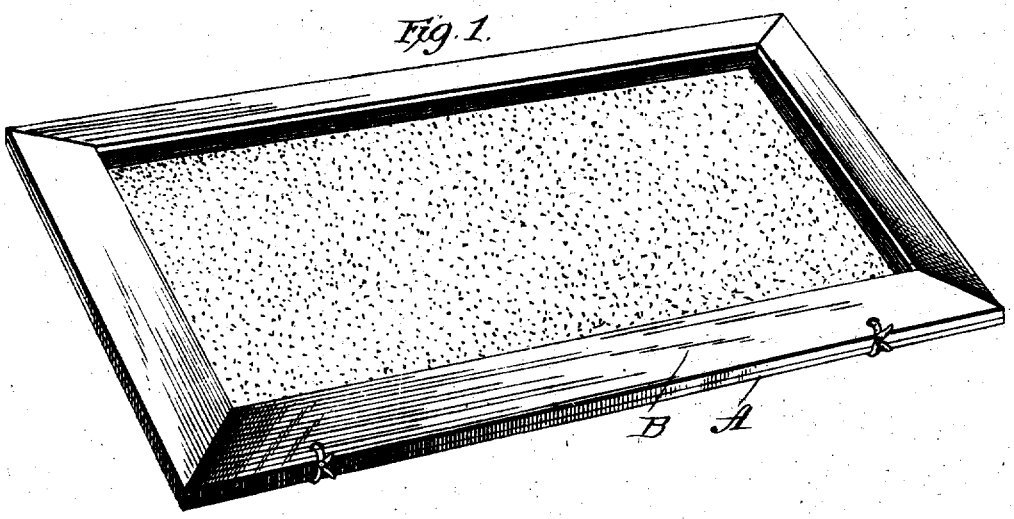

O. & W THUM.

COMBINED STICKY FLY PAPER HOLDER AND TRAP.

No. 11,000. Reissued Apr. 30, 1889.

Attest:
Walter Middleton
James McSpear

Inventors
OTTO THUM
Wm THUM
by Ellis Spear
Atty.

UNITED STATES PATENT OFFICE.

OTTO THUM AND WILLIAM THUM, OF GRAND RAPIDS, MICHIGAN.

COMBINED STICKY FLY-PAPER HOLDER AND TRAP.

SPECIFICATION forming part of Reissued Letters Patent No. 11,000, dated April 30, 1889.

Original No. 393,273, dated November 20, 1888. Application for reissue filed March 8, 1889. Serial No. 302,539.

*To all whom it may concern:*

Be it known that we, OTTO THUM and WILLIAM THUM, of Grand Rapids, in the county of Kent and State of Michigan, have invented a new and useful Improvement in a Combined Sticky Fly-Paper Holder and Trap, of which the following is a full, clear, and exact description.

Heretofore in the use of fly-paper, as it has been made by coating one side of a flexible sheet of paper with a sticky substance which attracts and catches the flies, a number of disadvantages have been met with, more or less objectionable; and it is the object of our present invention to remove these objections and at the same time to increase the efficiency of the fly-paper as a trap to attract and catch the flies. As the fly-paper is composed of thin sheets and flexible, they are liable to be blown about by the slightest draft, and, as ordinarily used, the sheets are simply laid about on convenient surfaces and thus are susceptible to drafts of air. As the sticky material is very adhesive, it will thus smear and adhere to any surface or article of furniture upon which it may be blown by the wind. Another objection is that as the edges of the paper are free from the material and the central portion only covered the paper has a tendency to curl up at the edges, which thus lessens the exposed sticky surface. Further, it has disadvantages as a trap, for the reason that the flies in approaching the sticky material from the unsmeared margins of the sheets enter into it cautiously, and can disentangle themselves if they only get into it a little way, and we have found by observation that many flies approach the sticky surface from the margins. To overcome all these objections and to provide a more convenient way of placing the material of the fly-paper than by carrying it in the hand, which is liable to smear the fingers and get upon the person of the one who is carrying it, we have provided a holder, which by reason of its novel construction is adapted to be placed in many positions where the loose sheets cannot be placed. It holds the paper firmly by its edges and prevents it from being turned over or blown away. It prevents the curling up of the edges. It serves as a guard to prevent contact with persons who may inadvertently be near it. It lessens to a great extent the unsightliness of the fly-paper. It prevents the sticky material from flowing in hot weather onto the surface upon which the paper rests, as the holder will receive any such flow, and when the fly-paper is not required for use the holder may be placed away and the sticky material kept moist for a greater length of time than when the loose sheets are exposed to the air. Our holder also combines the advantages of a trap, as it hinders the flies from approaching from the margin, the construction rendering it necessary for them to fly directly upon the surface in order to ascertain its nature, as none of the unsmeared portion of the paper appears within sight; and again, when the flies have once been caught upon the surface, they will not turn toward the clean border to escape, by reason of the fact that the holder is provided with an overlapping rim above the sticky surface, and this makes a darkness around the edge of the paper which repels instead of attracts the flies, and they will thus struggle toward the center and thus get deeper into the sticky material.

Our invention therefore consists of a holder and trap provided with a support for the fly-paper, and a rim arranged to overhang the margin of the fly-paper when it is in place; and it consists, further, in details of construction, all as hereinafter explained.

Figure 2:
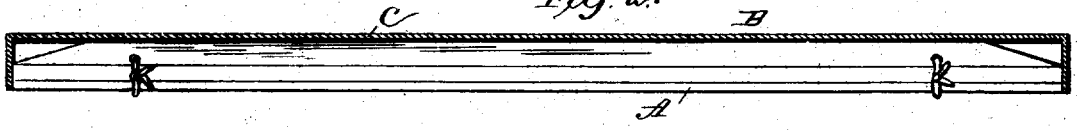
Figure 3:
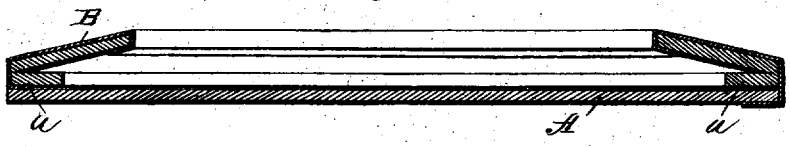

In the drawings, Figure 1 represents a perspective view of our improved holder and trap with a sheet of paper in place. Fig. 2 shows it covered. Fig. 3 is a section showing the construction of the rim.

In the drawings, A represents the supporting-plate upon which the sheet of paper containing the sticky material is placed, with the sticky or covered surface uppermost. Hinged to this supporting-plate is a rim, B, which has upon its under face a rectangular frame, *a*, of suitable width, which, when in place upon the sheet of fly-paper, presses its edges against the bottom plate, A, and thus holds it securely in place. It will be understood that all the fly-paper is made with a margin, which is uncovered by the sticky material, and the frame *a* bears upon this margin, so that it never becomes smeared with the material. The rim B extends upwardly and inwardly from the frame *a*, the sides of the rim being of width sufficient to entirely conceal from view the unsmeared edge of the paper, and by reason of its elevation it is above the surface of the paper to the extent of about half an inch. We have found about an inch and a half to be the proper width for the rim. This covers up the uncovered portions of the sheet and shows only the sticky surface. When the sticky paper is placed in position and the rim B placed upon it, the rim may be held in place, so as to prevent any displacement of the paper, by any suitable kind of clasp or fastening device fastening the edges of the rim and base-plate together. We have simply shown perforations through the rim and base-plate, and they may be secured together by means of a string or ribbon.

It will be seen by reason of its construction that all the disadvantages enumerated of the simple sheets heretofore used are obviated, and the sheet is held securely within the holder, which gives it a neat appearance and enables it to be used anywhere with perfect safety and without liability of smearing, even should it be turned over. It forms, also, as we have before mentioned, a perfect trap, as the flies cannot approach the sticky surface except by crawling up the inclined rim, and we make this rim preferably of approximately the same color as the sticky surface and varnish with a hard drying and shining varnish, so that the flies are led to believe that the sticky surface is only a continuation of the material of the rim. As the rim is about a half-inch above the surface, they cannot approach to investigate, but must fly directly upon it. They will not drag themselves toward the unsmeared portions, for the reason that the rim covering said portions makes it dark along the edges, and the natural tendency of the fly is to struggle out toward the center, and thus few escape. When the holder with the sticky sheet is not in use, an ordinary cover, C, is placed over the top, and this retards the drying action and keeps it moist for a great length of time. When in use, the cover may simply be removed from the top and serve as a shallow tray to receive the holder.

We are aware that it is not new to provide a fly-trap in two parts fitted to hold over upon themselves and provided between the parts with open-work material covered with sticky substance.

We claim as our invention—

1. A combined holder and trap consisting of a support for the fly-paper, and an open frame or holding-rim above the paper, said rim being extended upwardly and inwardly, substantially as described.

2. A combined holder and trap consisting of a support for the fly-paper, and an open frame or holding-rim above the paper, the said rim being inclined inwardly and upwardly, substantially as described.

3. A holder for fly-paper consisting of a base-plate to support the paper, and a hinged open frame or rim for clamping the paper to the base-plate, said rim extending inwardly and upwardly, so that its inner edge is above the fly-paper, substantially as described.

4. A combined holder and trap consisting of a base-plate, a rim inclined inwardly and upwardly, having its inner edges above the surface of the fly-paper, said rim being hinged to the base-plate, and a cover for the holder, substantially as described.

5. A combined holder and trap consisting of the base-plate and rim hinged thereto having a clamping-frame, *a*, and a fastening for holding the rim and base-plate together, substantially as described.

OTTO THUM.
WILLIAM THUM.

Witnesses:
FREDERICK LOETTGERT,
WM. BARTH.